United States Patent
Schafer, Jr.

(10) Patent No.: US 10,625,684 B1
(45) Date of Patent: Apr. 21, 2020

(54) WEIGHT DISTRIBUTING CARGO RACK SYSTEM FOR USE ON VEHICLES

(71) Applicant: George J. Schafer, Jr., Pennington, NJ (US)

(72) Inventor: George J. Schafer, Jr., Pennington, NJ (US)

(*) Notice: Subject to any disclaimer, the term of this patent is extended or adjusted under 35 U.S.C. 154(b) by 0 days.

(21) Appl. No.: 16/276,596

(22) Filed: Feb. 14, 2019

(51) Int. Cl.
- *B60R 9/045* (2006.01)
- *B60R 9/052* (2006.01)
- *B60R 9/058* (2006.01)

(52) U.S. Cl.
CPC .............. *B60R 9/045* (2013.01); *B60R 9/052* (2013.01); *B60R 9/058* (2013.01)

(58) Field of Classification Search
CPC .. B60R 9/04; B60R 9/08; B60R 9/052; B60R 9/058; B60R 9/042; B60R 9/0423; B60R 9/0426; B60R 9/045; B60R 9/048; B60R 9/05; B60R 9/055
USPC ........................................ 224/322, 325, 329
See application file for complete search history.

(56) References Cited

U.S. PATENT DOCUMENTS

| | | | | |
|---|---|---|---|---|
| 2,119,051 A | * | 5/1938 | Le Boeuf | B60R 9/058 224/325 |
| 2,621,836 A | * | 12/1952 | McMiller | B60R 9/055 224/328 |
| 2,746,628 A | * | 5/1956 | Neyra | B60R 9/0423 414/462 |
| 3,366,295 A | * | 1/1968 | Nygaard | B60R 9/055 224/319 |
| 3,495,750 A | * | 2/1970 | Casimiro | B60R 9/045 224/320 |
| 4,376,611 A | * | 3/1983 | Koop | A61G 3/0209 224/310 |
| 4,396,138 A | * | 8/1983 | Kirschner | B60R 9/12 211/70.5 |
| 4,538,752 A | | 9/1985 | Welter | |
| 4,630,990 A | * | 12/1986 | Whiting | B60R 9/042 224/310 |
| 5,076,479 A | * | 12/1991 | Davison | B60R 9/045 211/49.1 |
| 5,154,563 A | * | 10/1992 | Phillips | B60R 9/0426 224/326 |
| 5,340,007 A | * | 8/1994 | Jeuffray | B60R 9/045 224/315 |
| 5,464,140 A | * | 11/1995 | Hill | B60R 9/045 224/315 |
| 5,556,015 A | * | 9/1996 | Vincent | B60R 9/055 224/309 |
| 5,904,463 A | * | 5/1999 | Christensen | B60R 9/042 224/310 |
| 5,931,359 A | * | 8/1999 | Zona | B60R 9/045 224/319 |

(Continued)

*Primary Examiner* — Justin M Larson
(74) *Attorney, Agent, or Firm* — LaMorte & Associates

(57) ABSTRACT

The present invention is a vehicle cargo rack system for use on a vehicle Roof mounts are attached to the roof. A cargo bar is provided. The cargo bar has a first end, an opposite second end, and a midsection. The cargo bar is supported above the roof by the roof mounts. When a load is attached to the vehicle, the load is placed atop the cargo bar, wherein the weight of the load is borne by the cargo bar. A plurality of support legs extends from the midsection of the cargo bar to the roof. The support legs contact the roof and transfer the forces across the roof.

18 Claims, 6 Drawing Sheets

(56) References Cited

U.S. PATENT DOCUMENTS

| | | | |
|---|---|---|---|
| 6,152,339 A | 11/2000 | Kreisler | |
| 6,446,850 B2* | 9/2002 | Ming-Shun | B60R 9/058 |
| | | | 224/324 |
| 9,376,002 B2* | 6/2016 | Bennett | B60J 7/061 |
| 9,663,153 B2* | 5/2017 | Clark | B60R 9/05 |
| 2006/0086767 A1* | 4/2006 | Harberts | B60R 9/04 |
| | | | 224/329 |
| 2006/0237501 A1* | 10/2006 | Gonzalez | A01K 97/08 |
| | | | 224/325 |
| 2006/0273121 A1* | 12/2006 | Thomas | B60Q 1/2611 |
| | | | 224/322 |
| 2008/0047993 A1* | 2/2008 | Wooten | B60R 9/00 |
| | | | 224/325 |
| 2011/0101056 A1 | 5/2011 | Barkey | |
| 2012/0193380 A1 | 8/2012 | McMurtrie | |
| 2014/0069971 A1 | 3/2014 | van Kaathoven | |
| 2018/0370448 A1* | 12/2018 | Schafer, Jr. | B60R 9/052 |
| 2019/0308673 A1* | 10/2019 | Mar | B60J 7/106 |

\* cited by examiner

WEIGHT DISTRIBUTING CARGO RACK SYSTEM FOR USE ON VEHICLES

BACKGROUND OF THE INVENTION

1. Field of the Invention

In general, the present invention relates to roof racks and cargo racks that are designed to attach to the roof of a vehicle. More particularly, the present invention relates to roof racks and cargo racks that distribute weight across the roof of a vehicle.

2. Prior Art Description

Most all commercially sold vehicles have a roof. Many vehicles, such as the Jeep® Wrangler®, have a roof system that is either removable or retractable. This enables the vehicle to be fitted with either a soft top roof, a hard-top roof, or a hybrid roof with sliding panels depending upon the preferences of the owner. Since the roof system is removable and/or retractable, it is not integrated into the structural framework of the vehicle. In order to keep the vehicle safe and stable, the vehicle is typically designed with support bars that extend laterally across the top of the vehicle. The support bars of the vehicle serve as anchors and supports to the roofing system, wherein the soft top or hard top pass over the support bars.

Soft top roofs, removable hardtop roofs and panel roofs lack the physical strength to support much weight. In such a vehicle, a problem occurs when a person attempts to attach a roof rack or some other cargo rack to the top of the vehicle. The edge of the roof system on its own lacks the integrity to hold any substantial loads. If the roof system is removed and the roof rack is attached directly to the support bars of the vehicle, then the presence of the roof rack prevents the soft top or hard top from being installed. The vehicle must therefore remain as a convertible for as long as the roof rack is in place. Such prior art systems are exemplified by U.S. Patent Application Publication No. 2012/0193380 to McMurtrie and U.S. Pat. No. 6,152,339 to Kreisler. If the roof rack is installed atop the soft top or hard top, then holes must be formed in the soft top or hard top so that the forces of the load can be transferred through the roof system to the underlying support bars. This damages the roof system and promotes leaking and tearing. Such prior art systems are exemplified by U.S. Pat. No. 4,538,752 to Welter.

The only alternative is to create brackets that attach to the framework of the vehicle at points around the periphery of the roofing system. Such prior art systems are exemplified by U.S. Patent No. 2011/0101056 to Barkey and U.S. Patent Application Publication No. 2014/0069971 to Van Kaathoven. Such prior art systems have frame elements that extend down the sides of the roof and often adversely alter the aesthetics of the vehicle.

A similar problem occurs with many tradition vehicles that have integral roofs. Although the roofs are integrated into the chassis of the vehicle, only certain sections of the roof are supported by framing. Large areas of the roof are little more than unsupported panels of sheet metal that can hold very little weight without bending. Accordingly, when roof racks are attached to such roofs, they can only be attached to supported areas of the roof in order to prevent damage to the roof.

A need therefore exists for a roof rack system for vehicles, wherein the roof rack system transfers loads to the roof of the vehicle without damaging the existing roof or roofing system. A need also exists for a roof rack system that does not detract from the overall aesthetics of the vehicle. These needs are met by the present invention as described and claimed below.

SUMMARY OF THE INVENTION

The present invention is a vehicle cargo rack system that mounts atop the roof of a vehicle. The roof may be a tradition integrated roof, or a roofing system that is retractable, removable and/or paneled. Roof mounts are attached to the roof. The preferred attachment points correspond to areas of the roof that overlay support framing or support bars. If gaps exist between the roof and the support framing or support bars, then these spaces can be filled with an auxiliary load transfer support. In this manner, the support framing or support bars can be caused to directly support areas of the roofs.

A cargo bar is provided. The cargo bar has a first end, an opposite second end, and a midsection between the first end and the second end. The cargo bar is supported above the roof by the roof mounts. When a load is attached to the vehicle, the load is placed atop the cargo bar, wherein the weight of the load is borne by the cargo bar.

A plurality of support legs extends from the midsection of the cargo bar to the roof. The support legs contact the roof and spread the forces of the load across the roof. If the roof has support framing or support bars under at least some of the support legs, then some of the load can be transferred to the frame through the structure of the roof.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention roof rack system can be adapted for use in many types of vehicles, the roof rack system is shown applied to two types of vehicles. The selected vehicles are a sports utility vehicle with a removable roof system, such as a Jeep® Wrangler®, and a car with a traditional metal roof. The illustrated embodiments are selected in order to set forth two of the best modes contemplated for the invention. However, the illustrated vehicles are intended to be representative of all vehicle, including cars, SUVs, vans and trucks. The illustrated embodiments are merely exemplary and should not be considered as limitations when interpreting the scope of the appended claims.

Figure 1:
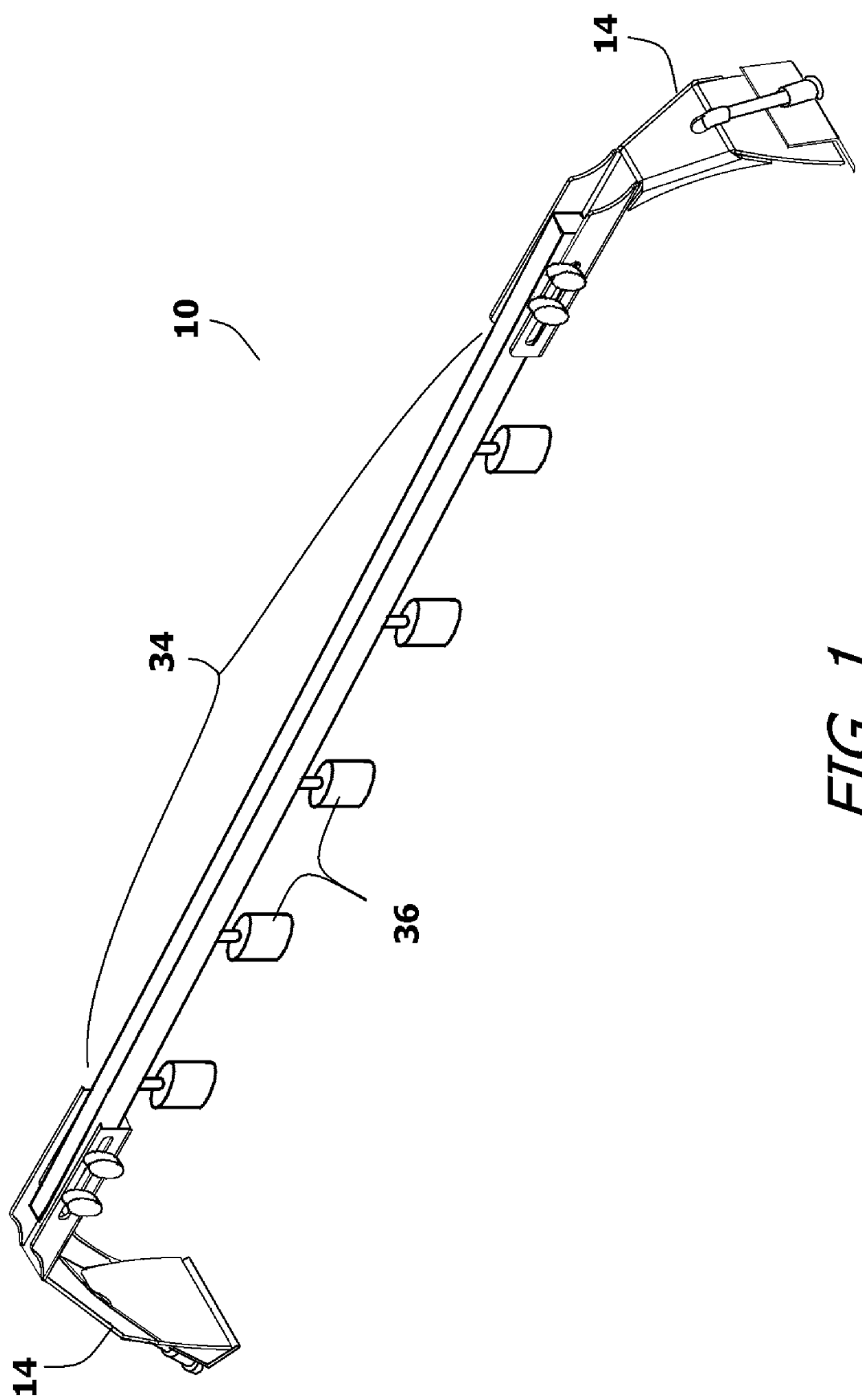
FIG. 1 is a perspective view of an exemplary embodiment of a cargo rack system.
Figure 2:
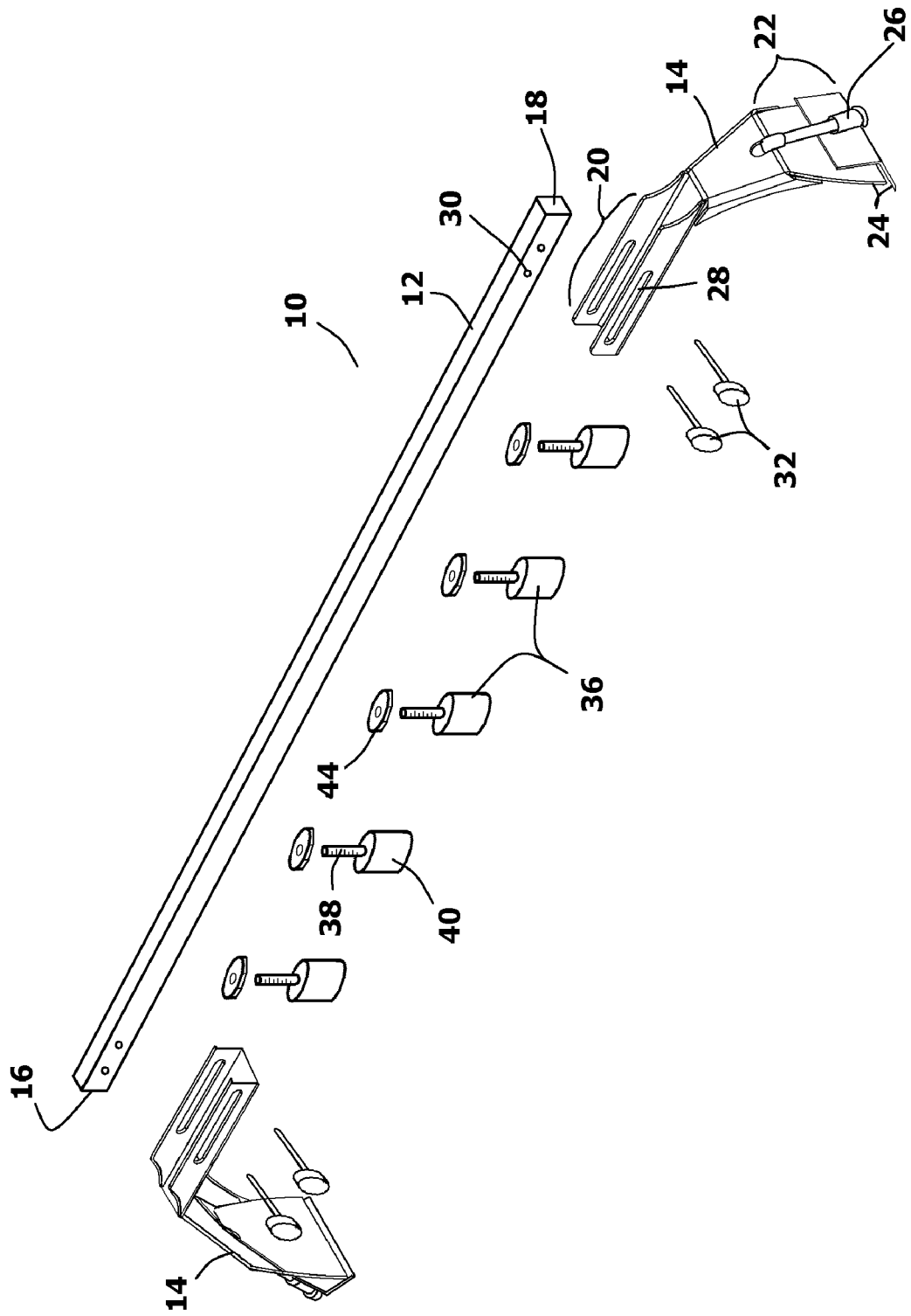
FIG. 2 is an exploded view of the exemplary embodiment of FIG. 1.

Referring to FIG. 1 and FIG. 2, a rack assembly 10 is shown. Although one rack assembly 10 is shown, it will be understood that two roof rack assemblies are typically mounted to a vehicle. Each rack assembly 10 includes a cargo bar 12 and two roof mounts 14. The cargo bar 12 is rigid and is preferably made of steel or aluminum. The cargo bar 12 is shown having a square cross-sectional profile. However, other profile shapes, such as round tubing, extruded aluminum, and I-beam constructs can also be used. The cargo bar 12 has a first end 16 and an opposite second end 18. The cargo bar 12 is long enough to span the roof of a typical vehicle. As such, the length of the cargo bar 12 is typically between three and five feet.

The roof mounts 14 are used to mechanically attach the cargo bar 12 to the roof of a vehicle. The roof mounts 14 attach to the cargo bar 12 at, or near, the first end 16 and the second end 18 of the cargo bar 12. Each roof mount 14 includes a support bracket 20 and a clamp 22. The clamp 22 has shaped jaws 24 and a mechanical fastener 26 that can be used to selectively loosen or tighten the jaws 24. As will later be shown, the jaws 24 engage a water guide ridge near the edge of a removable hardtop roof. In the prior art, there are several clamp configurations that are used to engage a water guide ridge on a vehicle roof. It will be understood that any such prior art clamp configuration can be adapted for use as part of the present invention. It will also be understood that the clamps can be configured to engage roof features other than water guides. For example, for some models of vehicles the clamps may engage front-to-back track bars that are manufactured as part of the roof.

The support bracket 20 of each roof mount 14 engages the cargo bar 12. The support bracket 20 can be either tubular or U-shaped, wherein the support bracket 20 can receive the cargo bar 12. Slots 28 are formed in the support bracket 20. The slots 28 align with mounting holes 30 in the cargo bar 12. The slots 28 enable the position of the roof mounts 14 to be adjusted along a length of the cargo bar 12. In this manner, the distance between the two roof mounts 14 can be adjusted to the requirements of different vehicle roofs. Once the roof mounts 14 are mounted to a vehicle and the cargo bar 12 is set into the roof mounts 14, fasteners 32 pass through the mounting holes 30 and slots 28 to affix the cargo bar 12 in place.

Figure 3:
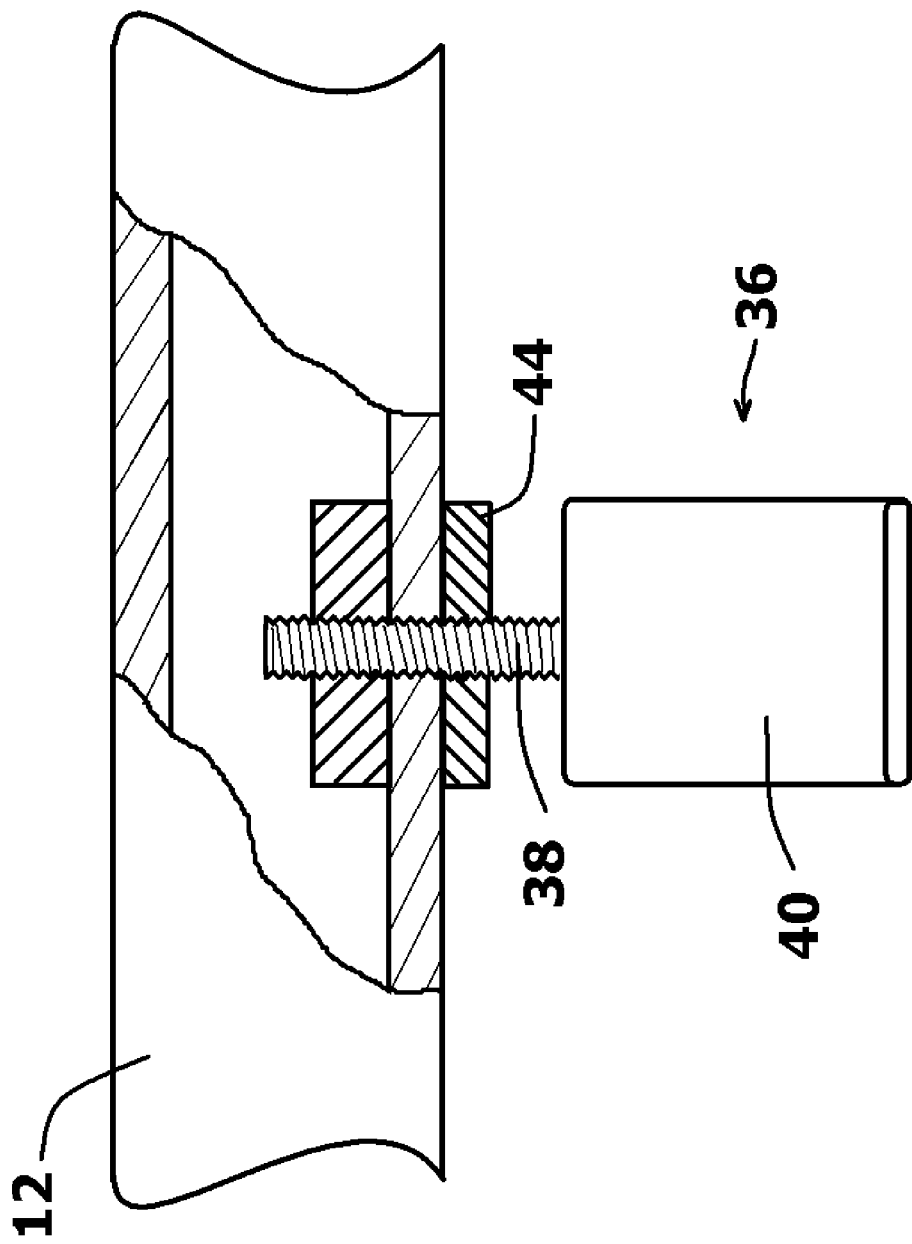
FIG. 3 shows a fragmented cross-sectional view of a section of the cargo rack system where a support leg engages the cargo bar.

Referring to FIG. 3 in conjunction with FIG. 1 and FIG. 2, it can be seen that the cargo bar 12 has a midsection 34 that extends between the two roof mounts 14. The midsection 34 is suspended a short distance above a vehicle roof by the roof mounts 14. A plurality of support legs 36 extend from the cargo bar 12. Each support leg 36 has a padded head 40 and an adjustable shaft 38. The adjustable shaft 38 has a length that can be selected adjusted by a user. In the shown embodiment, the adjustable shaft 38 has threads that engage threaded bores 42 within the cargo bar 12. In this manner, the distance that each of the support legs 36 can be extended from the cargo bar 12 can be selectively adjusted to the needs of a vehicle. Once a desired length is achieved, a locking mechanism 44, such as a lock nut can be tightened against the cargo bar 12 to lock the support legs 36 in place.

Figure 4:
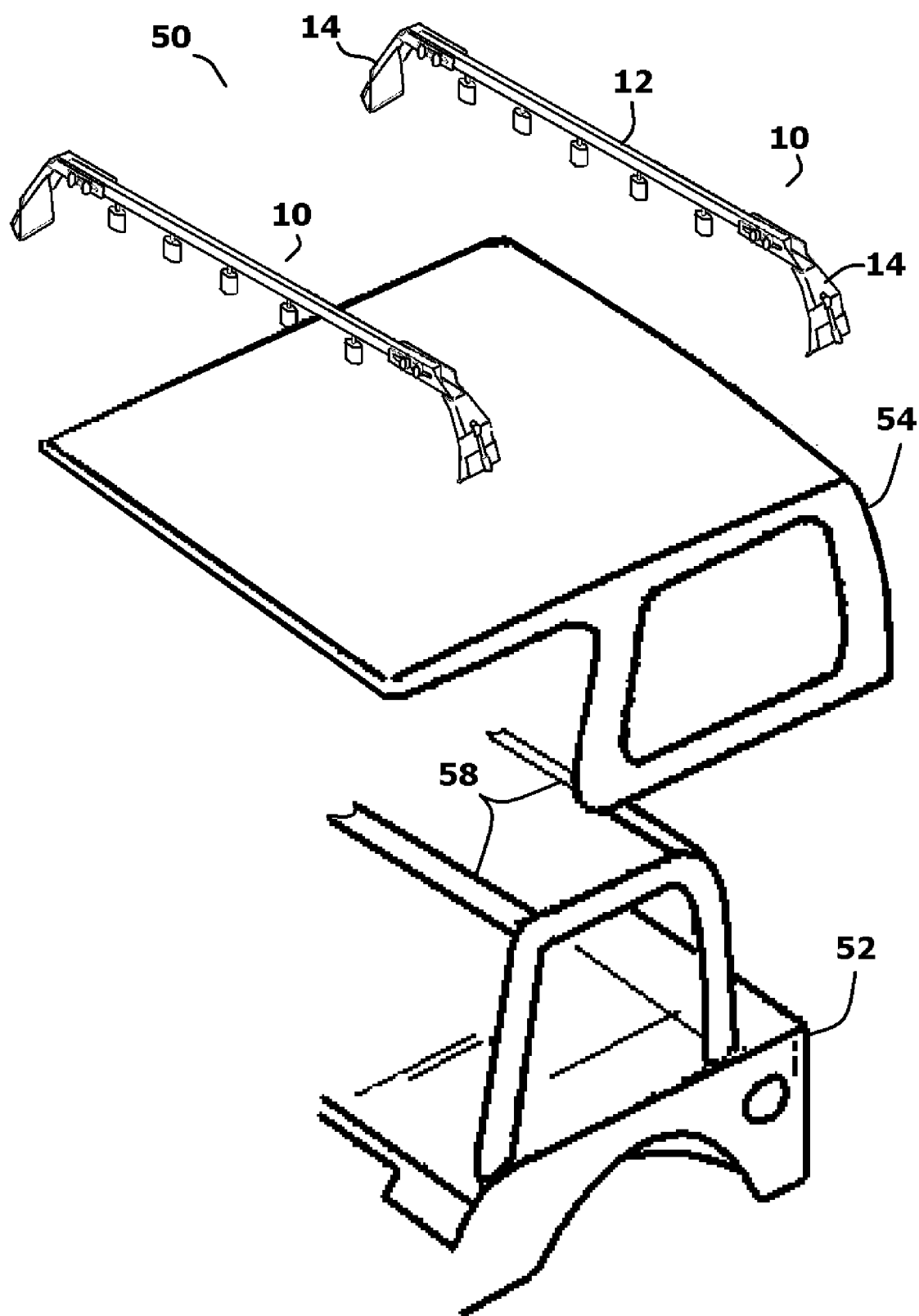
FIG. 4 shows the exemplary cargo rack system applied to a first vehicle with a removable roof and cross bars.
Figure 5:
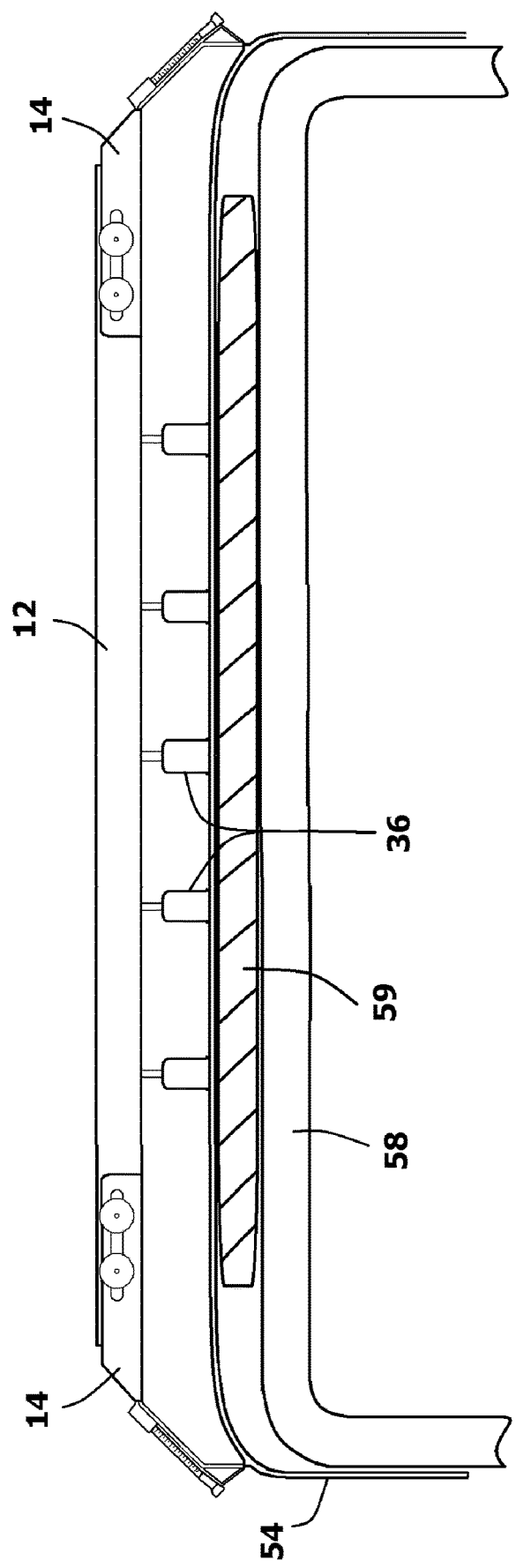
FIG. 5 shows a cross-sectional view of the embodiment of FIG. 4, viewed along section line 5-5.

Referring to FIG. 4 and FIG. 5 in conjunction with FIG. 2 and FIG. 3, it can be seen that in order to utilize the full cargo rack system 50, two or more rack assemblies 10 are mounted to a vehicle 52. The rack assemblies 10 are mounted in parallel. In the shown embodiment, the vehicle 52 is a Jeep® with a removable hardtop roof 54. The hardtop roof 54 has a water guide ridge 56 to facilitate the attachment of the clamps 22 on the roof mounts 14. The roof 54 extends above the support bars 58 of the vehicle 52. The roof 54 is anchored in place on the vehicle 52 in the traditional manner. The roof mounts 14 are attached to the roof 54 directly over the position of the support bars 58. The cargo bars 12 are then bolted to the roof mounts 14, wherein the cargo bars 12 extend between the roof mounts 14. The cargo bars 12, therefore, are suspended above the roof 54 directly above the underlying position of the support bars 58. The support legs 36 that descend from the cargo bars 12 are extended into contact with the roof 54. As such, any weight applied to the cargo bars 12 will be transferred to the support legs 36. The support legs 36 transfer the load to the roof 54 and, when applicable, to the support bars 58 directly under the roof 54. Depending upon the model and year of the vehicle, the roof 54 may rest directly upon the support bars 58. If a gap space exists between the roof 54 and the support bars 58, then an auxiliary support 59 can be provided. The auxiliary support 59 is sized to fit between the roof 54 and the support bars 58, therein enabling the force of the load to transfer through the auxiliary support 59 from the roof 54 to the support bar 58.

The roof 54 itself experiences compression under the support legs 36. However, due to the number of support legs 36, the compression forces are kept below the damage threshold of the roof 54, and no damage to the material of the roof 54 occurs.

In the shown embodiment, the cargo bars 12 are straight and flat. It will be understood that the cargo bars 12 can be specialized to carry different loads. For example, brackets can be added to the cargo bars 12 to hold bicycles, kayaks, tents, awnings, and the like. When traveling, the weight of the load on the cargo rack system 50 is transferred to the roll bars 58, which can easily sustain the weight of the load. The roof mounts 14 support only a small part of the load and primarily bear the lateral forces to prevent the cargo rack system 50 from falling off the vehicle during turns and changes in acceleration.

Figure 6:
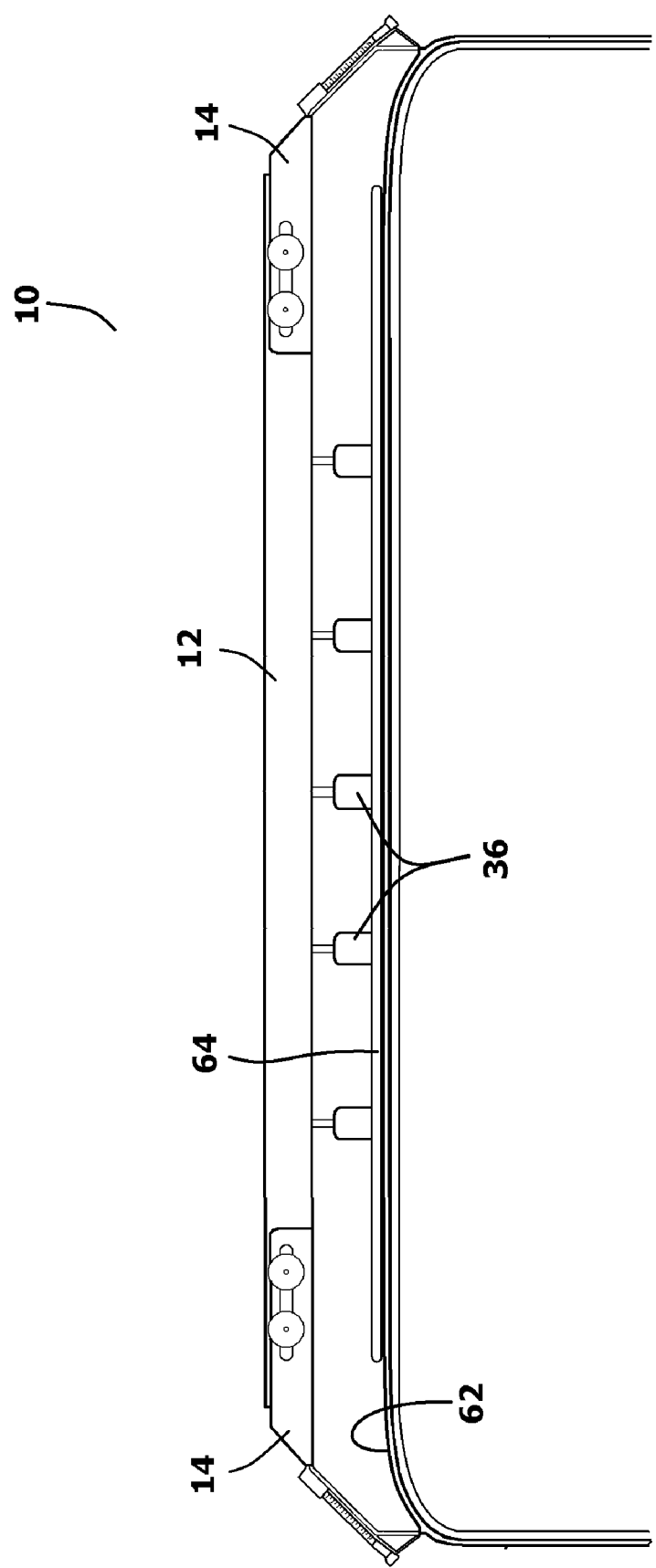
FIG. 6 shows the exemplary cargo rack system applied to a second vehicle with an integral sheet-metal roof.

Referring to FIG. 6 in conjunction with FIG. 2 and FIG. 3, a rack assembly 10 is shown mounted to a traditional vehicle with a sheet metal roof 62. The rack assembly 10 is being mounted above a section of the roof 62 that does not have any underlying support. Accordingly, an auxiliary support plate 64 is provided. The support plate 64 is set upon the roof 62 under the rack assembly 10. The roof mounts 14 are attached to the roof 62 in the traditional manner. The cargo bars 12 is then bolted to the roof mounts 14, wherein the cargo bar 12 extends between the roof mounts 14. The support legs 36 that descend from the cargo bar 12 are extended into contact with the support plate 64 on the roof 62. As such, any weight applied to the cargo bars 12 will be transferred first to the support plate 64 and then to the roof 62. If the roof 62 is directly supported by internal frame elements, the use of the support plate 64 may not be required. The support plate 64 is an option that helps further distribute the load from the cargo rack assembly 10 to the roof of the vehicle.

It will be understood that the embodiments of the present invention that are illustrated and described are merely exemplary and that a person skilled in the art can make many variations to these embodiments. All such embodiments are intended to be included within the scope of the present invention as defined by the claims.

What is claimed is:

1. A cargo rack system that mounts to a roof of a vehicle, said system comprising:
   a cargo bar having a first end, an opposite second end, and a midsection between said first end and said second end;

roof mounts connected to said cargo bar proximate said first end and said second end, wherein each of said roof mounts includes a clamp for attaching said roof mounts to said roof of said vehicle;

a plurality of support legs extending from said midsection of said cargo bar in a common direction, wherein said support legs contact said roof and support said cargo bar when said cargo rack system is mounted to said roof; and a support plate that is positioned between said support legs and said roof, wherein said support legs contact said support plate.

2. The system according to claim 1, wherein said support legs are selectively adjustable in length.

3. The system according to claim 1, wherein said cargo bar has threaded bores formed therein and said plurality of support legs have threaded shafts that engage said threaded bores.

4. The system according to claim 3, wherein each of said plurality of support legs has a head that is supported by one of said threaded shafts.

5. The system according to claim 1, wherein said roof mounts contain support brackets that support said cargo bar at a first elevation.

6. The system according to claim 1, wherein said support brackets contain slots that enable said cargo bar to mount to said support brackets in a range of adjustable positions.

7. A cargo rack system for a vehicle with a support bar, said system comprising:

a roof supported above said support bar;

roof mounts attached to said roof above said support bar;

a cargo bar having a first end, an opposite second end, and a midsection between said first end and said second end, wherein said cargo bar is supported above said roof by said roof mounts; and a plurality of support legs extending from said midsection of said cargo bar to said roof, wherein said plurality of support legs contact said roof above said support bar.

8. The system according to claim 7, further including an auxiliary support positioned between said roof and said support bar that transfers forces between said roof and said support bar.

9. The system according to claim 7, wherein said support legs are selectively adjustable in length between said cargo bar and said roof.

10. The system according to claim 9, wherein said cargo bar has threaded bores formed therein and said plurality of support legs have threaded shafts that engage said threaded bores.

11. The system according to claim 10, wherein each of said plurality of support legs has a head that is supported by one of said threaded shafts, wherein said head contacts said roof.

12. The system according to claim 7, wherein said roof mounts contain support brackets that support said cargo bar at a first elevation above said roof, wherein said plurality of support legs have a length at least as long as said first elevation.

13. The system according to claim 12, wherein said cargo bar is selectively adjustable within said support brackets.

14. A cargo rack system for a vehicle, said system comprising:

a roof that extends over a support bar;

roof mounts attached to said roof;

a cargo bar having a first end, an opposite second end, and a midsection between said first end and said second end, wherein said cargo bar is supported above said support bar and said roof by said roof mounts; and support legs extending from said midsection of said cargo bar to said roof, wherein said support legs contact said roof above said support bar.

15. The system according to claim 14, wherein said support legs are selectively adjustable in length between said cargo bar and said roof.

16. The system according to claim 14, wherein said support legs thread into said cargo bar and can be adjusted in length by turning said support legs relative said cargo bar.

17. The system according to claim 14, wherein said roof mounts contain support brackets that support said cargo bar at a first elevation above said roof, wherein said support legs have lengths at least as long as said first elevation.

18. The system according to claim 17, wherein said cargo bar is selectively adjustable within said support brackets.

* * * * *